United States Patent [19]

Gdovin

[11] 4,350,489  
[45] Sep. 21, 1982

[54] DOME FIELD OF VIEW SCENE EXTENDERS

[75] Inventor: David P. Gdovin, Vestal, N.Y.

[73] Assignee: The Singer Company, Binghamton, N.Y.

[21] Appl. No.: 213,521

[22] Filed: Dec. 5, 1980

[51] Int. Cl.³ .............................................. G09B 9/08
[52] U.S. Cl. ................................................... 434/40
[58] Field of Search ............................... 434/40, 43, 44

[56] References Cited

U.S. PATENT DOCUMENTS

| | | | |
|---|---|---|---|
| 2,975,671 | 3/1961 | Hemstreet | 434/43 X |
| 2,999,322 | 9/1961 | Hemstreet | 434/43 |
| 3,114,979 | 12/1963 | Fox | 434/44 |
| 3,621,214 | 11/1971 | Romney et al. | |
| 3,643,345 | 2/1972 | Wilton et al. | 434/44 |
| 3,670,426 | 6/1972 | Horowitz | 434/43 |
| 3,718,989 | 3/1973 | McKnight | 434/40 |
| 3,758,714 | 9/1973 | Herndon | 434/43 |
| 3,826,864 | 7/1974 | Paufve | 434/43 X |
| 3,961,133 | 6/1976 | Bennett | |
| 3,998,532 | 12/1976 | Dykes | 434/40 X |

Primary Examiner—William H. Grieb
Attorney, Agent, or Firm—Jeff Rothenberg; Douglas M. Clarkson

[57] ABSTRACT

In a vehicular simulator including a cockpit and visual system wherein the visual system includes a hollow, partial spherical screen 18 surrounding a cockpit 14, and wherein both the cockpit 14 and spherical screen 18 are supported by a base support structure 16 such that the nominal eye point 24 of a pilot operator sitting in the cockpit 14 is at or near the center of the spherical screen 18. Improvement apparatus is provided comprising a first base means or structure 38 for providing a selected increase of the distance between the nominal eye point 24 and base platform 16. A second spacing means 40 and 42 are also provided which maintains the same selected distance increase between the spherical center of the screen 18 and the base platform 16. Left and right curved screen panels 44 and 46 having a spherical surface with the same diameter as the spherical screen are provided to the left and right of cockpit 14 such that bottom edge of spherical screen 18 is increased in selected areas by the panels.

5 Claims, 5 Drawing Figures

DOME FIELD OF VIEW SCENE EXTENDERS

GOVERNMENT LICENSE

The government has rights in this invention pursuant to contract number F33657-78-C-0592 awarded by the department of the Air Force.

TECHNICAL FIELD

This invention relates generally to visual systems for vehicle simulators and more particularly to apparatus for providing an extended field of view from an extreme eye point for visual systems using large spherically shaped panoramic screens. More particularly, this invention enlarges the display area with respect to the pilots downward field of view such that walkways or other simulator structures do not encroach upon the projected scene.

BACKGROUND ART

There are various types of scene generation systems which are used with modern vehicle or aircraft simulators and include motion film projection systems, camera model systems, and digital image generation systems. However, experience has shown that the more acceptable systems used today include camera model systems such as described in U.S. Pat. Nos. 2,975,671; 3,643,345; 3,670,426 and 3,961,133. Another acceptable visual system for use with todays modern aircraft simulators is one that produces a computer generated image such as those systems described in U.S. Pat. Nos. 3,621,214; 3,826,864 and 3,961,133.

Although the camera model system and the computer image generating system create or generate visual scenes by entirely different techniques, both of these systems may use one or more CRT's (cathode ray tubes) for presentations of the desired visual scene. In certain of these type systems, the CRT's are viewed directly, whereas in other systems the CRT's are viewed by means of optics such as beam splitters and/or mirrors. However, for certain types of applications, it has been found that the scene can better be viewed in certain simulation situations if the scene is projected onto a large panoramic or dome shaped screen surrounding (or partially surrounding) the simulator and observer. For these purposes, CRT projectors, video projectors and laser projector displays are particularly useful.

The use of projected images on a panoramic screen has been found particularly useful in certain types of aircraft simulation. To achieve a completely realistic and panoramic view for an aircraft simulator, it will be appreciated that a substantially spherical screen with a pilots eye located at or near the screen's center would be necessary. Fortunately, since the aircraft is always "below" the pilot, there is a very limited FOV (field of view) in the downward direction. Consequently, most of the panoramic screens which use a spherical screen or dome configuration need not provide a complete spherical screen in the "hemisphere" "below" the pilot since the simulator pilot has unlimited view only in the top "hemisphere". That is, assuming that the pilot's eye is fixed at or near a point at the center of the panoramic or spherical screen, it is not necessary to provide a complete bottom "hemisphere" of the screen since the aircraft itself limits the pilot's vision or FOV in the downward direction. Consequently, it has been the practice with prior art spherical screens that only the portion of the bottom hemisphere of the screen which is in the FOV or line of sight from the nominal eye "point" is provided. That is, where the "aircraft" structure itself intersects a line of sight originating from the nominal eye point it is only necessary to provide these portions of the spherical screen which are visible.

This approach has been successful for most uses, but as more and more effort is made to increase the realism of simulation systems, the limitations of this type of partial spherical screen have become apparent. For example, so long as the pilot does not move his head from the nominal eye point which is at or near the center of the spherical screen, he will have a full view provided by the visual system. However, such a fixed eye point for a pilot is not realistic since a pilot is continually turning and moving his head within the cockpit for better views and for close observation of his environment. Consequently, it has been found that when the simulator pilot moves his head to an extreme point within the cockpit such items as supports, platform walkways, and other simulator structures which are unnatural in the actual flight environment of an aircraft become apparent.

A particularly objectionable feature is the sudden intrusion of the simulator platform walkway in the pilot's FOV when he moves his head to look down over the side of the aircraft. When this occurs, it is obvious that all the effort and trouble to present the illusion of a real flight scene to a pilot may be destroyed. Therefore, since it is desirable that any training situation closely simulate the real life situation, it is essential that for effective aircraft simulation that the pilot be free to move his head with the same freedom that he would have in an actual aircraft. Further, when the pilot moves his head to an extreme position he should only be presented with the desired simulated scene and not have the illusion destroyed by the intrusion of simulator structure.

Therefore, it is an object of the present invention to provide a simple and inexpensive technique for providing a more complete panoramic view to a simulator pilot regardless of the position of the pilot's eye point.

It is still another object of this invention to provide a more complete spherical screen for a simulator visual system which readily allows maintenance to the simulator but which still provides convenience for the simulator pilot in access to and egress from the simulator.

It is yet another object of this invention to provide a more complete spherical visual screen without requiring complete redesign of the simulator support structure or the existing spherical screen.

DISCLOSURE OF THE INVENTION

Other objects and advantages will in part be obvious, and will in part appear hereinafter, and will be accomplished by the present invention which provides new apparatus for improving the display area of a spherical screen used in a projection visual system. The apparatus of this invention is an improvement for a vehicular simulator which includes a cockpit and a projection visual system. The visual system includes a hollow, partial spherical screen surrounding the cockpit, so that the inside surface of the hollow spherical screen provides the display area. The spherical screen and the cockpit are supported by a base platform so that the nominal eye point of an operator or student pilot in the cockpit is substantially at or near the center of the spherical screen. The spherical screen also includes left and right bottom edges with respect to the location of the cockpit. The improvement of this system comprises a spacing means for supporting the cockpit such that the distance between the nominal eye point of the cockpit and the base platform is increased a selected distance. A second spacing means also raises the display screen so that the distance between the spherical center of the screen and the base platform is also increased the selected distance. Left and right curved panels having a multiplicity of edges defined a selected shape. In a preferred embodiment, the panels have four edges and define a curved, yet substantially, rectangular shape. The curved surface of the panel defines a portion of the inside surface of a hollow sphere which has the same diameter as the diameter of the spherical screen. Selected edges of the left panel are formed to correspond with the left bottom edge of the spherical screen. In a like manner, the selected edges of the right panel are formed to correspond with the right bottom edge of the spherical screen. The left and right panels are then supported such that the display area of the spherical screen is increased so that an operator of the vehicle simulator will view the screen panels and any visual scene presented thereon when the operators eye point is moved from the nominal to the extreme left and right limits.

BRIEF DESCRIPTION OF THE DRAWINGS

The above mentioned features of the present invention will be more clearly understood from consideration of the following description in connection with the accompanying drawings in which.

BEST MODE FOR CARRYING OUT THE INVENTION

Figure 1:
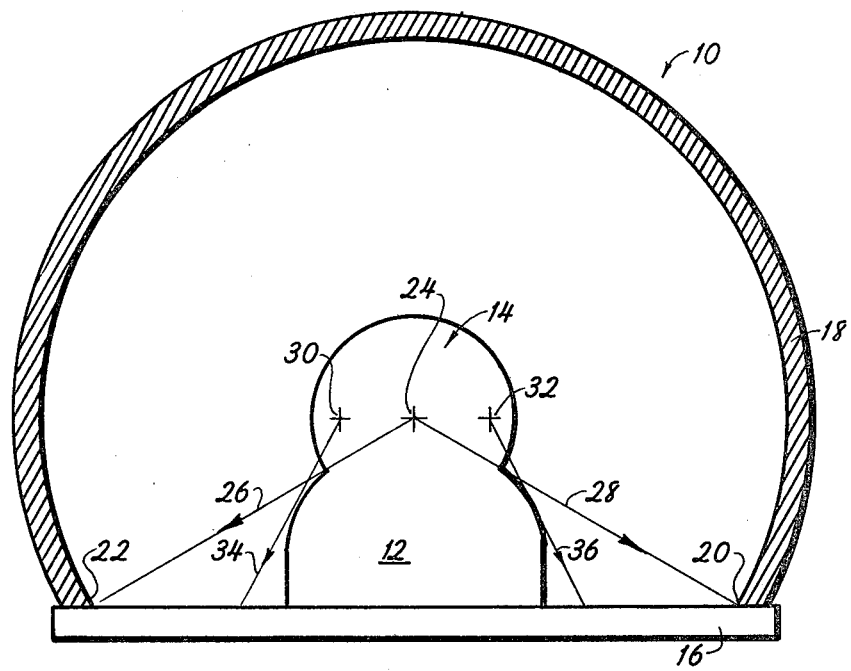
FIG. 1 is a diagrammatical front view of a prior art spherical screen and cockpit.

Referring now to FIG. 1, there is shown generally at 10 a diagrammatical front view of a prior art vehicular simulator system which includes a simulator 12 having a cockpit or controls section 14 supported by a base platform 16. The simulator 12 is enclosed by a partial spherical screen 18 which is also supported at its bottom edges 20 and 22 by said base platform 16. The vehicle simulator 12 and the spherical screen 18 are supported on platform 16 such that the nominal eye point 24 of an operator (not shown) sitting in cockpit 14 of vehicle simulator 12 is at or near the center of the spherical screen 18. As shown, the bottom edges 20 and 22 intersect the platform 16 thereby eliminating the bottommost portion of spherical screen 18. Also as is shown, a line of sight taken from nominal eye point 24 and represented on the left side by arrow line 26 and on the right side by arrow line 28 intersects spherical screen 18 at the intersection of bottom edges 22 and 20 with base platform 16. Thus, it will be appreciated that so long as the operator of the vehicular simulator maintains his eye point at the nominal eye point of the cockpit, platform 16 is out of view of the operator since the structure of the aircraft cockpit obscures the vision of the operator with respect to platform 16. Thus, so long as the operators eye point remains at the nominal eye point 24, a visual scene can be presented on the spherical screen without the simulated illusion of an actual flight being destroyed by the intrusion of the simulator base platform 16.

However, it will be appreciated that a competent pilot in an aircraft does not maintain his head in one position and does in fact move his head in all directions and to all areas possible within the cockpit to afford himself the best possible view above, to the sides, and below him at all times. Thus, it will be appreciated that at times the pilots eye point will be removed from the nominal eye point 24 and may in fact be at the left extreme eye point 30 or the right extreme eye point 32. In such instances, it will be appreciated that the pilots line of sight from extreme point 30 follows arrow line 34 on the left side and arrow line 36 from extreme point 32 on the right side. Thus, as can be seen, if the pilot moves his head such that his eye point is at these extreme limits, his FOV is changed such that base platform 16 encroaches upon his view when he looks in a direction "beneath" the aircraft. Consequently, it will be appreciated that it would be desirable for the spherical screen to be extended such that a visual scene can be displayed on the screen so the scene would be visible even when the pilot has moved his eye point to an extreme eye point. With such an improvement, the flight illusion would not be destroyed by the intrusion of the base platform 16 upon the pilots vision. However, simply increasing the total area of the spherical screen would be costly, and for that matter unnecessary since only movement of the pilots head to the extreme left and right will reveal the platform. That is, movement of the pilots head in a forward or rearward extreme position does not result in any appreciable increase of his FOV (field of vision) in a downward direction as the rear of the aircraft and the front of the aircraft will continue to obscure his field of vision in these directions.

Figure 2:
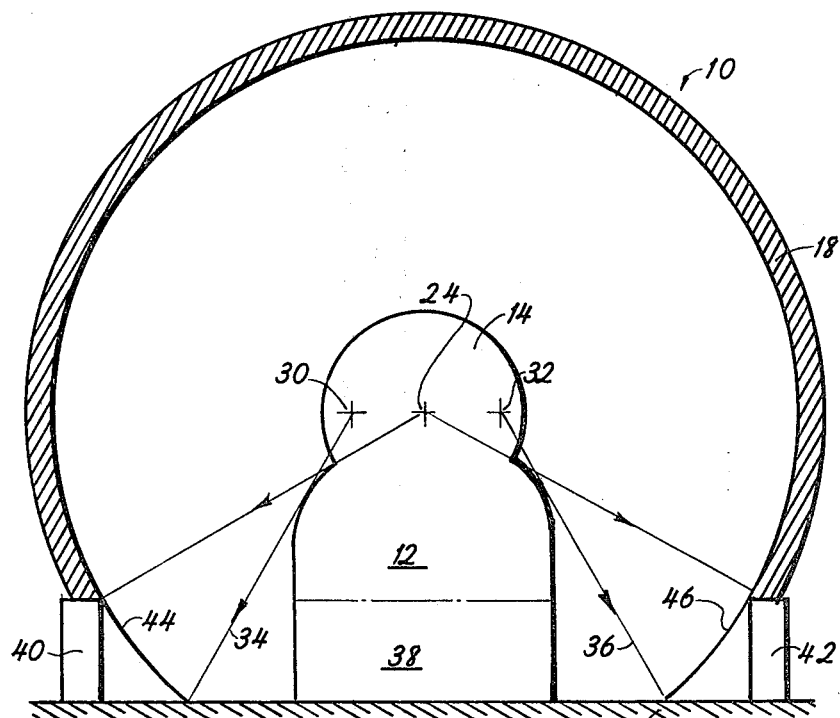
FIG. 2 is a diagrammatical front view of a spherical screen and cockpit incorporating the features of this invention.

Therefore, referring now to FIG. 2 there is shown a diagrammatical front view of an aircraft simulator system having a spherical screen visual system. Those elements of FIG. 2 which are the same as shown in FIG. 1 retain the same reference numbers. As shown, vehicular simulator 12 having cockpit 14 is still surrounded by a spherical screen 18 supported by a base 16 such that the nominal eye point 24 of the operator in the cockpit is still at or near the center of the spherical screen. However, there is also included means or support structure 38 for increasing the distance of nominal eye point 24 a selected amount above platform 16. In a similar manner, left support 40 and right support 42 are also included to increase the distance of spherical screen 18 above base platform 16 the same amount. Also included is a left removable spherical surface panel 44 and a right removable spherical surface panel 46. Thus, as is shown, if the operator of the simulator now moves his eye point from the nominal point 24 to one of the extreme eye points 30 or 32, his line of sight intersects one of these removable extensions 44 and 46 as is illustrated by line of sight lines 34 and 36. Thus, it will be appreciated that if a visual scene is presented on these removable sections 34 and 46 the base platform 16 will not be in the simulator pilot's FOV when he moves his head to the extreme eye points, and thus the flight illusion will not be destroyed. At the same time, the panels may readily be removed thereby leaving the platform walkways clear for access to and egress from the vehicle simulator.

Figure 3:
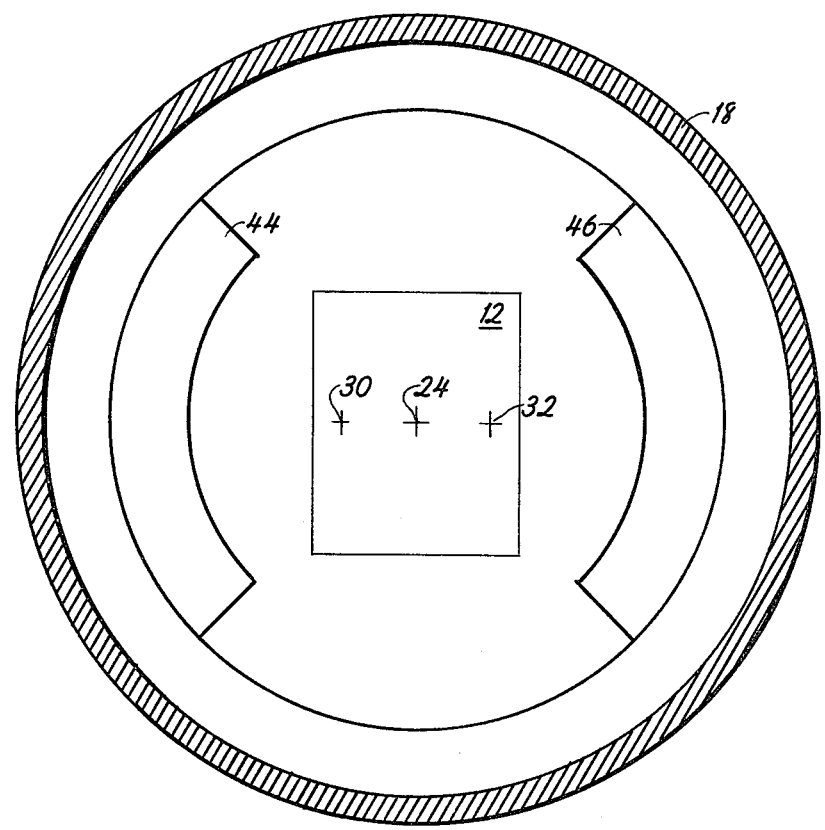
FIG. 3 is a diagrammatical top view of a spherical screen and cockpit incorporating the features of this invention.

Referring now to FIG. 3, there is shown a diagrammatical top view of the simulator spherical screen of FIG. 2. As shown in this Figure, the removable panels need not extend to the complete rear and aft portions of the simulator. It is unnecessary for removable panels 44 and 46 to extend to the fore and aft positions since the pilots FOV even when his eye point is moved to an extreme limit allowed by the cockpit, is still substantially obscured by the fore and aft portions of the aircraft such that he cannot look in a downward direction. Thus, it will be appreciated that it is only necessary that the removable side lower panels 44 and 46 extend partially around the vehicular simulator.

Figure 4:
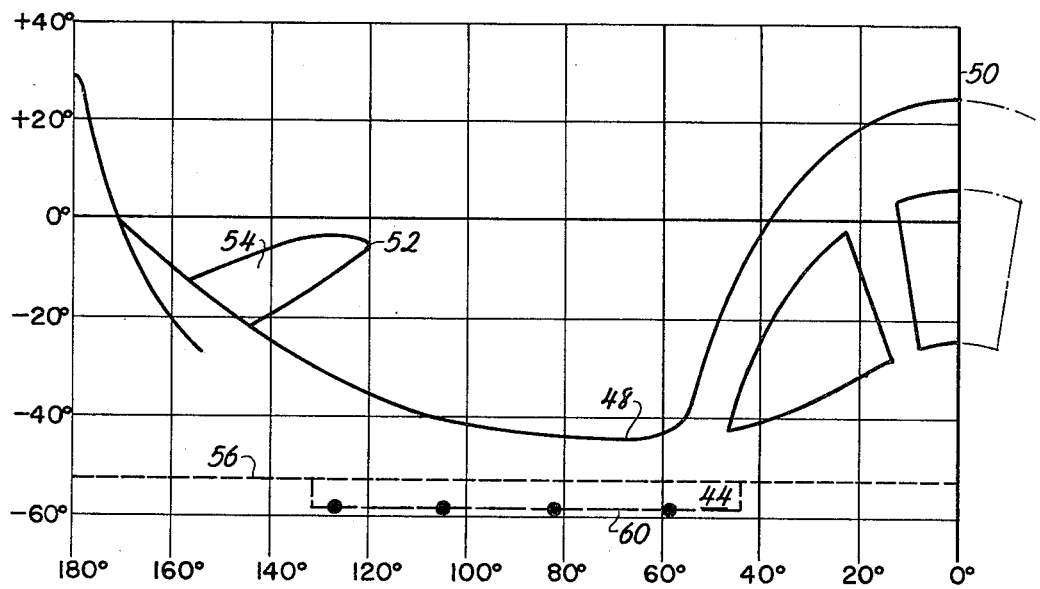
FIG. 4 shows a field of view plot from the cockpit nominal eye point of a spherical screen which includes the features of this invention.
Figure 5:
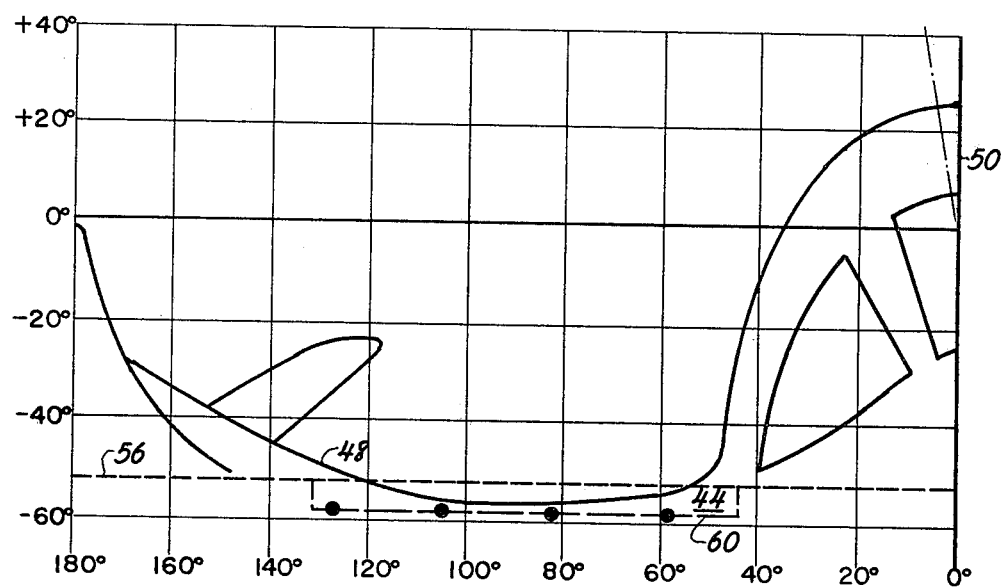
FIG. 5 shows a field of view plot from a cockpit extreme eye point of a spherical screen which includes the features of this invention.

Referring now to FIGS. 4 and 5, there is shown a plot of the field of view of a pilot in a downward direction from the nominal eye point. Curved line 48 represents the bottom edge of the window sill of the aircraft. As can be seen, the center line 50 represents the pilot looking in a forward direction as indicated by 0° at the horizontal axis of the plot. As the pilot turns his head towards the rear of the aircraft, it can be seen that the window sill of the aircraft is plotted from the completely forward direction indicated at 0° to the completely rearward direction indicated at 180°. Thus, as can be seen, head motion of approximately 122° to the left reveals tip 52 of the elevator 54 of the aircraft. Continued turning of the head would reveal the remainder of the elevator and would begin to pick up the tail section at about 160°. Rotation of the head to the right would also result in similar field of view and therefore need not be shown. The vertical axis of this graph represents the line of sight angle from the nominal eye point. Dashed line 56 represents the bottom left edge of the partial spherical screen. Line 60 represents the extension panel 42. Thus, it will be appreciated that since sill line 48 represents the extreme limit of the pilots field of view from the nominal eye point, the bottom edge represented by line 56 will not be visible and thus if the pilots eye point were maintained at this position dome extender 46 would not be necessary and the platform would never come into view.

However, referring to FIG. 5, there is shown a plot of a pilots field of view who has moved his head to the extreme eye point 32. As can be seen, window sill line 48 has now crossed well below the bottom edge of the spherical screen represented by line 56 such that the removable panel extension 46 is now within view. However, it can also be seen that the removable panel 46 is sufficiently large such that the sill line 48 does not extend below the bottom edge of the removable panel as represented by line 60. It will further be appreciated that if the pilot were to move his head to the extreme limit on the right hand side, the right hand panel 44 would provide a similar view. Thus, by extending the visual scene onto the removable panel it will be appreciated that the pilot will not be able to move his head to such an extreme position that the view presented on the spherical scene terminates and is replaced by platform 16 or other vehicular simulator structure.

Thus, although the present invention has been described with respect to specific apparatus for providing a selected increase to a spherical display screen of a visual system, it is not intended that such specific references be considered limitations upon the scope of this invention except insofar as is set forth in the following claims.

I claim:

1. In a vehicle simulator including a controls section and visual system, and wherein said visual system includes a hollow, partial spherical screen surrounding said controls section such that the inside surface of said hollow screen provides the display area for said visual system, and wherein said spherical screen and said controls section are supported by a base platform such that the nominal eye point of an operator of said controls section is in close proximity to or near the center of said spherical screen, and such that said partial spherical screen includes left and right bottom edges with respect to said cockpit, an improvement for increasing the display area of said screen comprising:
   first spacing means for increasing the distance between said nominal eye point of said controls section and said base platform a selected distance;
   second spacing means for increasing the distance between the spherical center of said screen and said base platform said selected distance;
   left and right curved screen panels with a multiplicity of edges defining a selected shape and having a curved surface, said curved surface defining a portion of the inside surface of a hollow sphere having the same diameter as said spherical screen, a selected one of said multiplicity of edges of said left panel formed to correspond with said left bottom edge of said spherical screen and a selected one of said multiplicity of edges of said right panel formed to correspond with said right bottom edge of said visible screen; and
   means for supporting said left and right curved panels with respect to said left and right bottom edges respectively such that the display area of said spherical screen is increased so that an operator of said vehicle simulator will view said screen panels and any visual scene presented thereon when said operator's eye point is moved from said nominal eye point to extreme left and right limits.

2. The apparatus of claim 1 wherein said vehicle simulator is an aircraft simulator.

3. The apparatus of claim 1 wherein said multiplicity of edges is four edges and said panel is in the shape of a sector of an annulus.

4. The apparatus of claim 2 wherein said multiplicity of edges is four edges and said panel is in the shape of a sector of an annulus.

5. The apparatus of claims 1, 2, 3 or 4 wherein said left and right curved panels are readily removable to provide access to selected portions of the simulator structure.

* * * * *